US006375262B1

(12) United States Patent
Watanabe

(10) Patent No.: US 6,375,262 B1
(45) Date of Patent: Apr. 23, 2002

(54) AUTOMOTIVE SEAT-BACK STRUCTURE

(75) Inventor: Yoshio Watanabe, Kanagawa-ken (JP)

(73) Assignee: Ikeda Bussan Co., Ltd., Kanagawa-ken (JP)

( * ) Notice: Subject to any disclaimer, the term of this patent is extended or adjusted under 35 U.S.C. 154(b) by 0 days.

(21) Appl. No.: 09/783,017

(22) Filed: Feb. 15, 2001

(30) Foreign Application Priority Data

Mar. 14, 2000 (JP) ........................................ 2000-070366

(51) Int. Cl.[7] .................................................. A47C 7/42
(52) U.S. Cl. ............................ 297/284.4; 297/216.12; 297/216.13
(58) Field of Search ........................ 297/216.12, 216.13, 297/216.14, 284.4

(56) References Cited

U.S. PATENT DOCUMENTS

| | | | | |
|---|---|---|---|---|
| 5,397,164 A | * | 3/1995 | Schuster et al. | 297/284.4 |
| 5,795,019 A | * | 8/1998 | Wieclawski | 297/216.12 |
| 6,250,714 B1 | * | 6/2001 | Nakano et al. | 297/216.12 |
| 6,273,511 B1 | * | 8/2001 | Wieclawski | 297/216.12 |

FOREIGN PATENT DOCUMENTS

WO          98/09838          3/1998

* cited by examiner

*Primary Examiner*—Anthony D. Barfield
(74) *Attorney, Agent, or Firm*—Nath & Associates PLLC; Gary M. Nath

(57) ABSTRACT

An automotive seat-back structure is provided to protect a passenger's neck vertebra at a vehicle's rear-end collision and also support the passenger's lumbar vertebra. The automotive seat-back structure includes a seat-back frame 2, an actuating member 4 and supporting means 7. A first supporting member 5 is carried by a lower end 2c of the seat-back frame 2, while a second supporting member 6 is carried by the actuating member 4 or the supporting means 7. The first and second supporting members 5, 6 carry a lumbar supporting member 8 capable of supporting the passenger's lumbar vertebra on pressure. The member 8 is carried so as to be rotatable back and forth and also movable up and down.

8 Claims, 7 Drawing Sheets

AUTOMOTIVE SEAT-BACK STRUCTURE

BACKGROUND OF THE INVENTION

The present invention relates to an automotive seat back. More particularly, it relates to an automotive seat-back structure which is capable of protecting a passenger's neck vertebra when the passenger's vehicle is run into from behind and which allows the passenger's lumbar vertebra to be pressed usually.

As the conventional automotive seat back of this kind, International Patent Publication No. WO 98/09838 discloses one seat back structure which comprises a rectangular seat-back frame, supporting means on the top of the seat-back frame, which is capable of swiveling back and forth and also shifting up and down, a headrest adapted so as to move back, forth, up and down and also carried by the upper end of the supporting means through a headrest holder attached to a stay, and an actuating member carried by the lower end of the supporting means and also capable of moving only by an impact pressure by the passenger's back.

Therefore, for example, when the passenger's vehicle has a collision from behind, then the seat back is subjected to an impact load directing forward and also a reactionary load due to the passenger's back, directing backward. In detail, the above loads are applied on a back element constructed in the seat-back frame and the actuating member as well. Then, the backward movement of the actuating member causes the upper end of the supporting means to be rotated in front about an upper side of the seat-back frame as a pivotal fulcrum and also to be shifted upward, so that the headrest on the upper end of the supporting means moves in a direction approaching the passenger's head.

Accordingly, even if the vehicle collision from behind causes the seat back to be bent backward due to the reactionary load of the passenger, the headrest instantaneously approaches the passenger's head to accept it certainly, whereby the passenger's neck can be protected.

In this way, the above-mentioned prior art structure is effective against the unusual vehicle's rear-end collision. However, if a lumbar supporting member for usually supporting the passenger's lumbar is also arranged in such a limited space of the seat-back frame, then the arrangement causes either or both of the lumbar supporting member and the actuating member to be small-sized, accompanying the unsatisfied constitution of the seat back structure. Consequently, an improvement in commercialization would be necessary in the seat back structure.

SUMMARY OF THE INVENTION

Under the above circumstance, it is an object of the present invention to provide an automotive seat-back structure which aims at the protection of the passenger's neck vertebra at the vehicle's rear-end collision and also the usual supporting of the passenger's lumbar vertebra, with satisfaction.

According to the invention, the above-mentioned object is accomplished by an automotive seat-back structure comprising a seat-back frame, supporting means carried by the seat-back frame, the supporting means being capable of swinging back and forth against an upper end of the seat-back frame and also capable of moving up and down against the upper end of the seat-back frame, a headrest supported by an upper end of the supporting means, an actuating member carried by a lower end of the supporting means, the actuating member being movable on only receipt of an impact pressure by a passenger's back, a first supporting member carried by a lower end of the seat-back frame, a second supporting member carried by either one of the actuating member and the supporting means, and a lumbar supporting member carried by the first supporting member and the second supporting member to support the passenger's lumbar vertebra on pressure, the lumbar supporting member being rotatable back and forth and also movable up and down.

With the arrangement mentioned above, when the actuating member is subjected to a load by the rear-end collision of the passenger's vehicle, then the supporting means allows the headrest to be moved forward and upward, thereby holding the passenger's neck vertebra.

Additionally, since the lumbar supporting member is carried by the actuating member and the supporting means through the second supporting member, the lumbar supporting member on receipt of no impact pressure is capable of supporting the passenger's lumbar vertebra as well as the member's movement due to the only receipt of impact pressure through the passenger's back.

According to the second feature of the invention, the lumbar supporting member comprises a lowermost part which is engageable with the first supporting member, an uppermost part which is engageable with the second supporting member, and first urging means formed in one body with a main part of the lumbar supporting member, the main part being capable of projecting forward to support the passenger's lumbar vertebra on pressure, the first urging means being adapted so as to encourage the main part's returning from its projected position.

According to the third feature of the invention, the automotive seat-back structure further comprises a yoke bar carried by the lowermost part of the lumbar supporting member, the yoke bar being capable of swinging against lowermost part of the lumbar supporting member, second urging means connected to one end of the yoke bar, for always urging the one end of the yoke bar upward, and operating means operatively connected to another end of the yoke bar, wherein the operation of the operating means allows the main part of the lumbar supporting member to be moved in opposition to the first urging means and the second urging means.

Accordingly, if only manipulating the operating means so as to project the main part, the passenger's lumbar vertebra can be supported by the so-moved lumbar supporting member in opposition to the first and second urging means.

According to the fourth feature of the invention, the first supporting member and the second supporting member are together made from wires.

Owing to the characteristics of wires, when the lumbar supporting member projects into deformation and also returns to the substantially-flattened position, it is possible to ensure the smooth rotations of the first and second supporting members.

According to the fifth feature of the invention, the supporting means comprises a pair of armature pipes arranged inside the seat-back frame so as to extend up and down.

According to the sixth feature of the invention, the main part of the lumbar supporting member includes a pair of first members separated from each other so as to extend up and down and a plurality of second members extending over the first members and the first urging means includes a pair of plate springs arranged along the first members respectively, thereby to urging the main part.

According to the seventh feature of the invention, the second urging means is in the form of a coil spring.

According to the eighth feature of the invention, the operating means comprises a cable connected to the other end of the yoke bar, a retractor allowing the cable to be wound thereinto, and a manipulating lever for operating the retractor to wind and rewind the cable.

These features of the present invention will become more fully apparent from the following description and appended claims taken in conjunction with the accompany drawing.

DESCRIPTION OF THE PREFERRED EMBODIMENT

Figure 1:
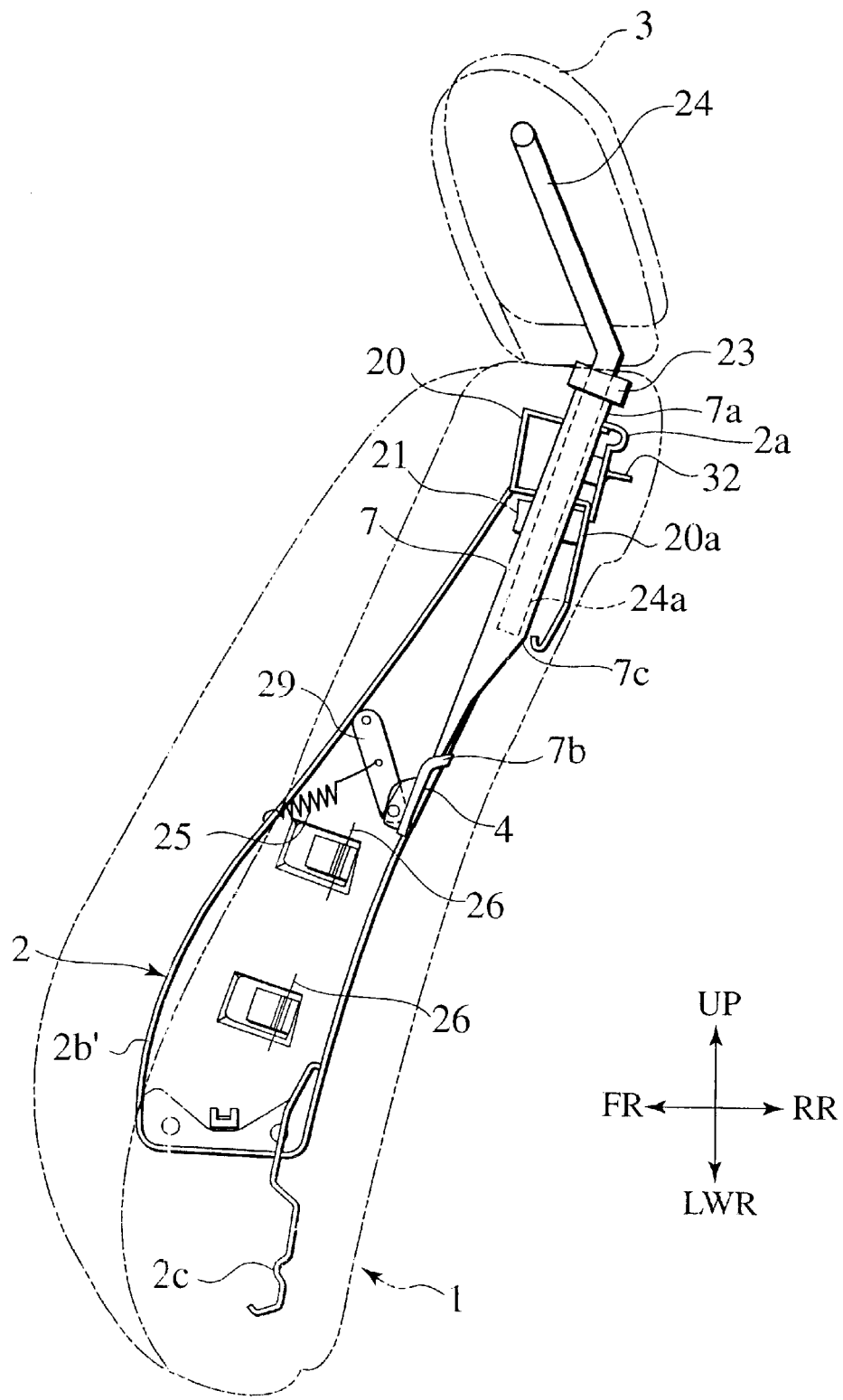
FIG. 1 is a sectional view of an automotive seat-back structure in accordance with an embodiment of the present invention, also eliminating a lumbar supporting member from the seat back.
Figure 2:
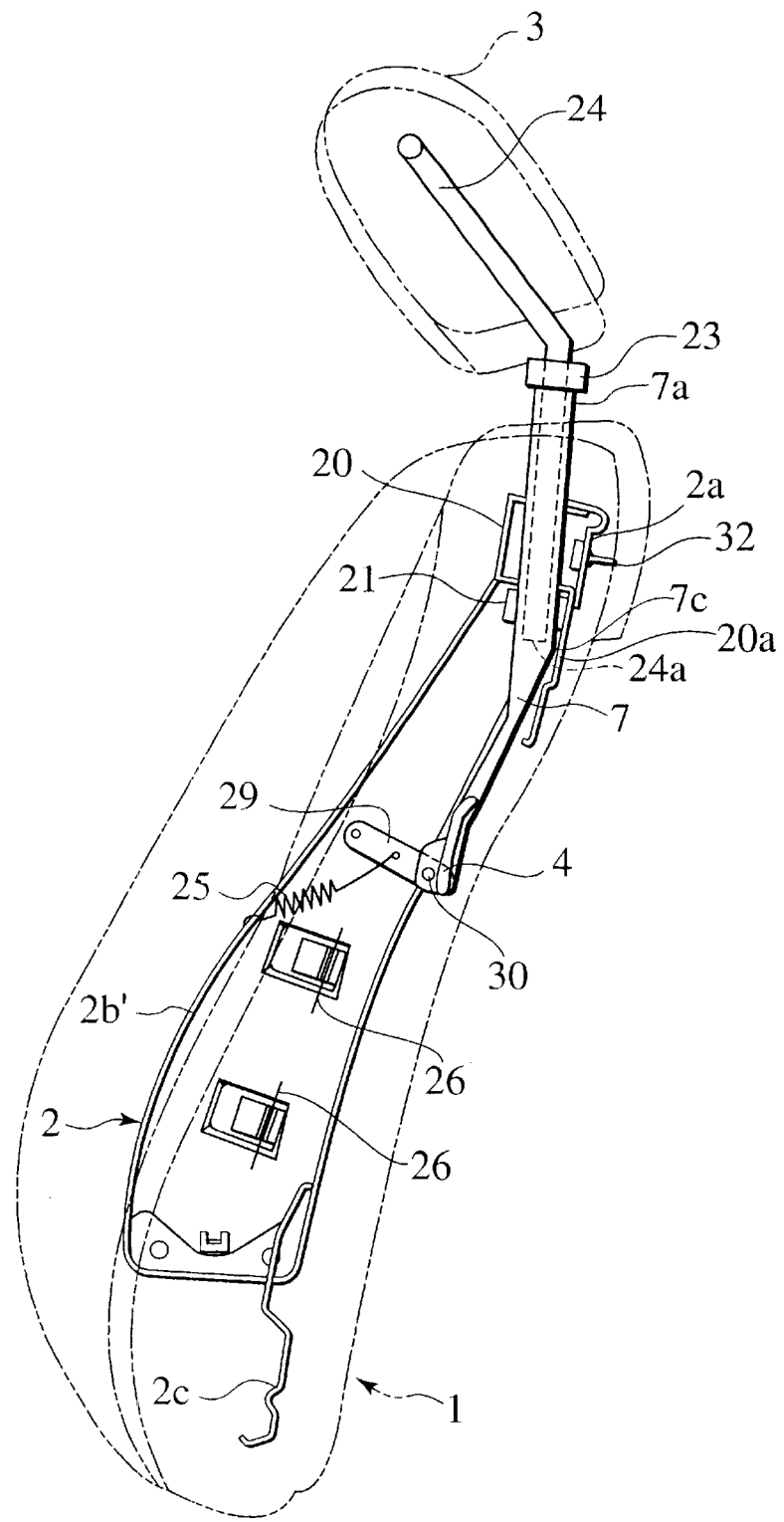
FIG. 2 is a sectional view of the automotive seat back of the embodiment, showing a condition that a headrest is moved to a position to support the passenger's head by the operation of an actuating member of FIG. 1.
Figure 3:
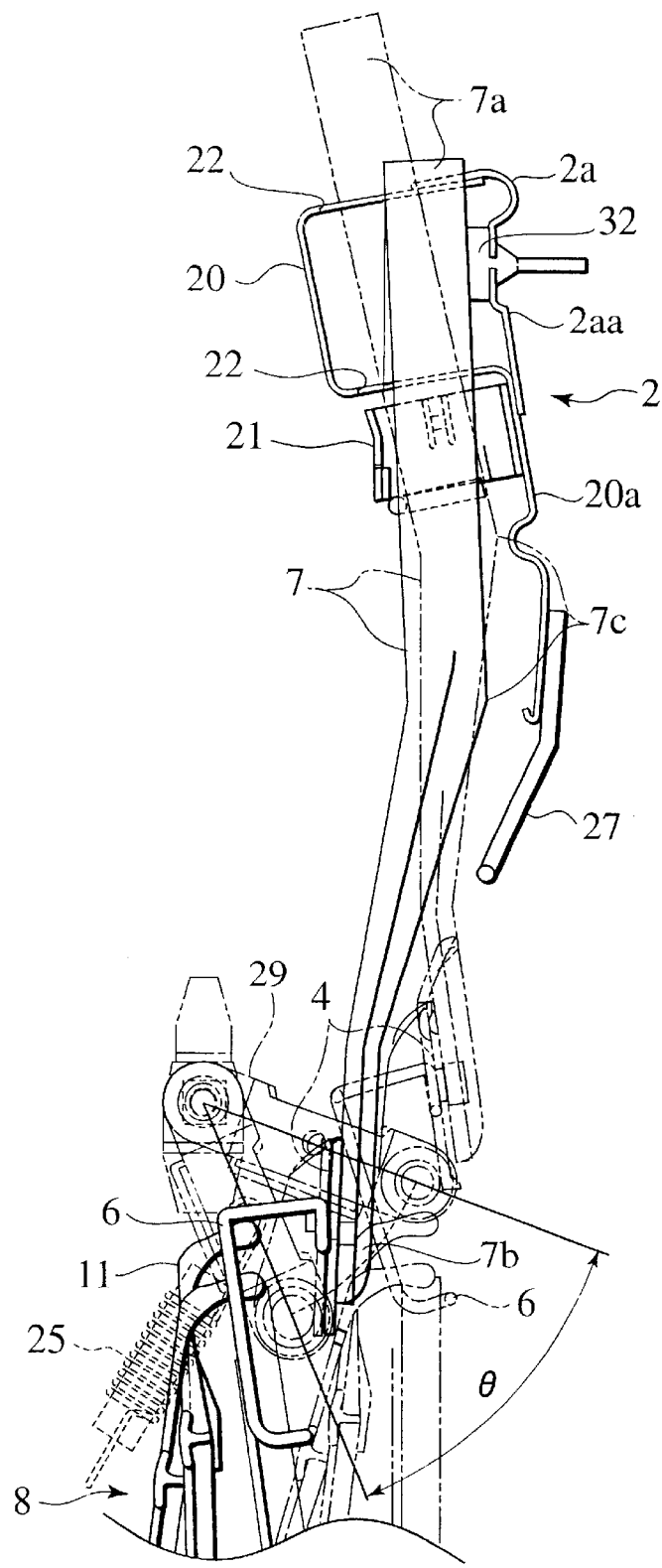
FIG. 3 is a sectional view of the automotive seat-back structure, showing a condition where the lumbar supporting member is joined in an essential part of FIG. 2.
Figure 4:
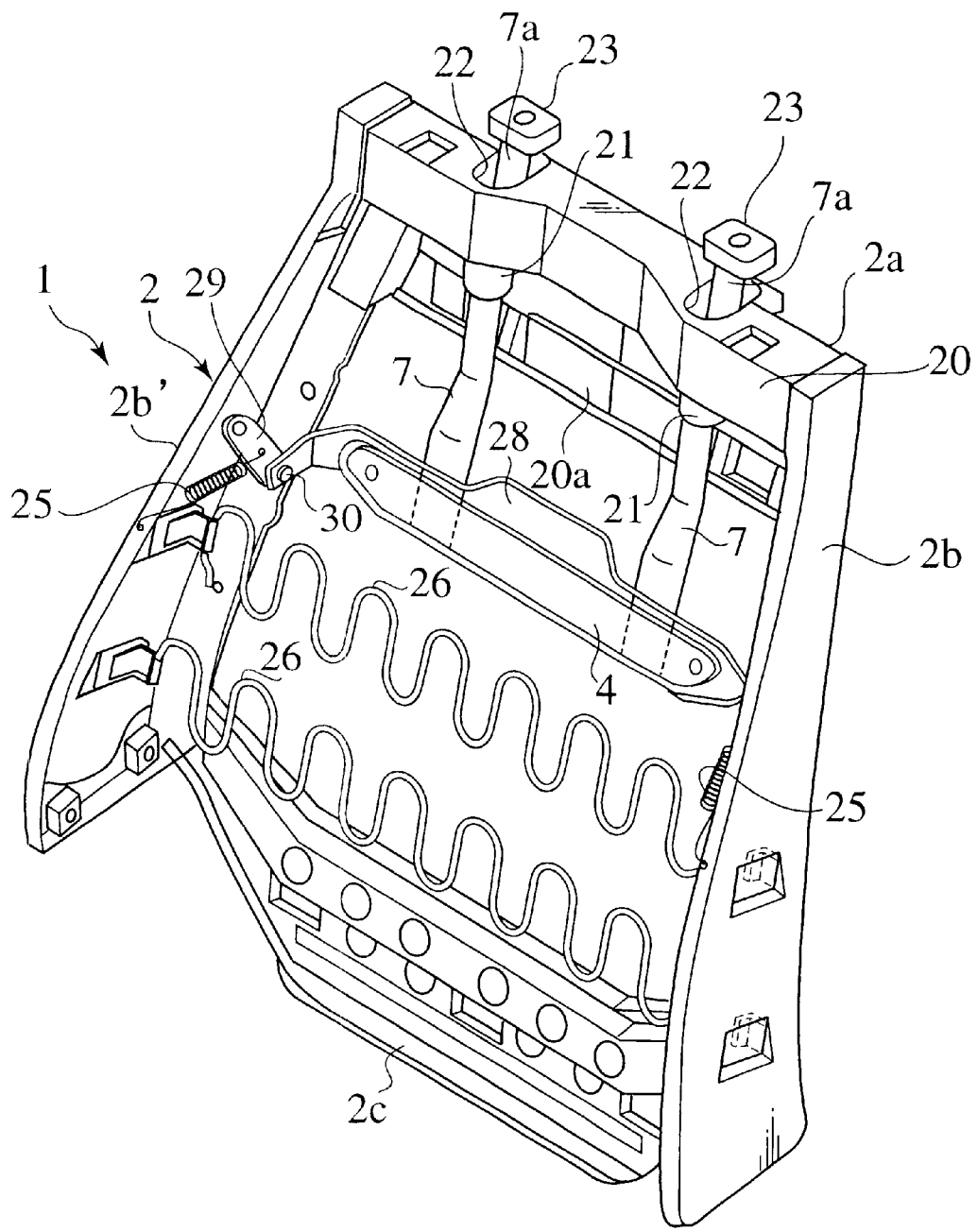
FIG. 4 is a perspective view of the automotive seat-back structure, showing a condition that the lumbar supporting member is eliminated from a seat-back frame of the seat-back structure of FIG. 1.

Referring to accompanying drawings, a preferable embodiment of the present invention will be described below. Note, in the following descriptions, a front side of an automobile is also represented by "FR", the rear side "RR", the upper side "UP", and the lower side is represented by FIGS. 1 to 7 illustrate one embodiment of the present invention. In these figures, reference numeral 1 designates a seat back of the automobile. The seat back 1 includes a seat-back frame 2 made from steel plates, armature pipes 7, 7 as "supporting means", a headrest 3 supported by respective upper ends 7a of the armature pipes 7, an actuating member 4 supported by respective lower ends 7b of the armature pipes 7, and a lumbar supporting member 8 carried by the seat-back frame 2 and the actuating member 4. By "an upper end" of the seat-back frame 2, namely, a later-mentioned upper frame 2a, the armature pipes 7, 7 are supported so as to rotate back and forth and also move up and down. The actuating member 4 is constructed to be moved only by an impact pressure exerted through a not-shown passenger's back. The seat back 1 further includes not-shown pads arranged before and behind the seat-back frame 2 and made of polyurethane foam and a not-shown outer layer for wrapping the pads, for example, an outer cloth.

Figure 5:
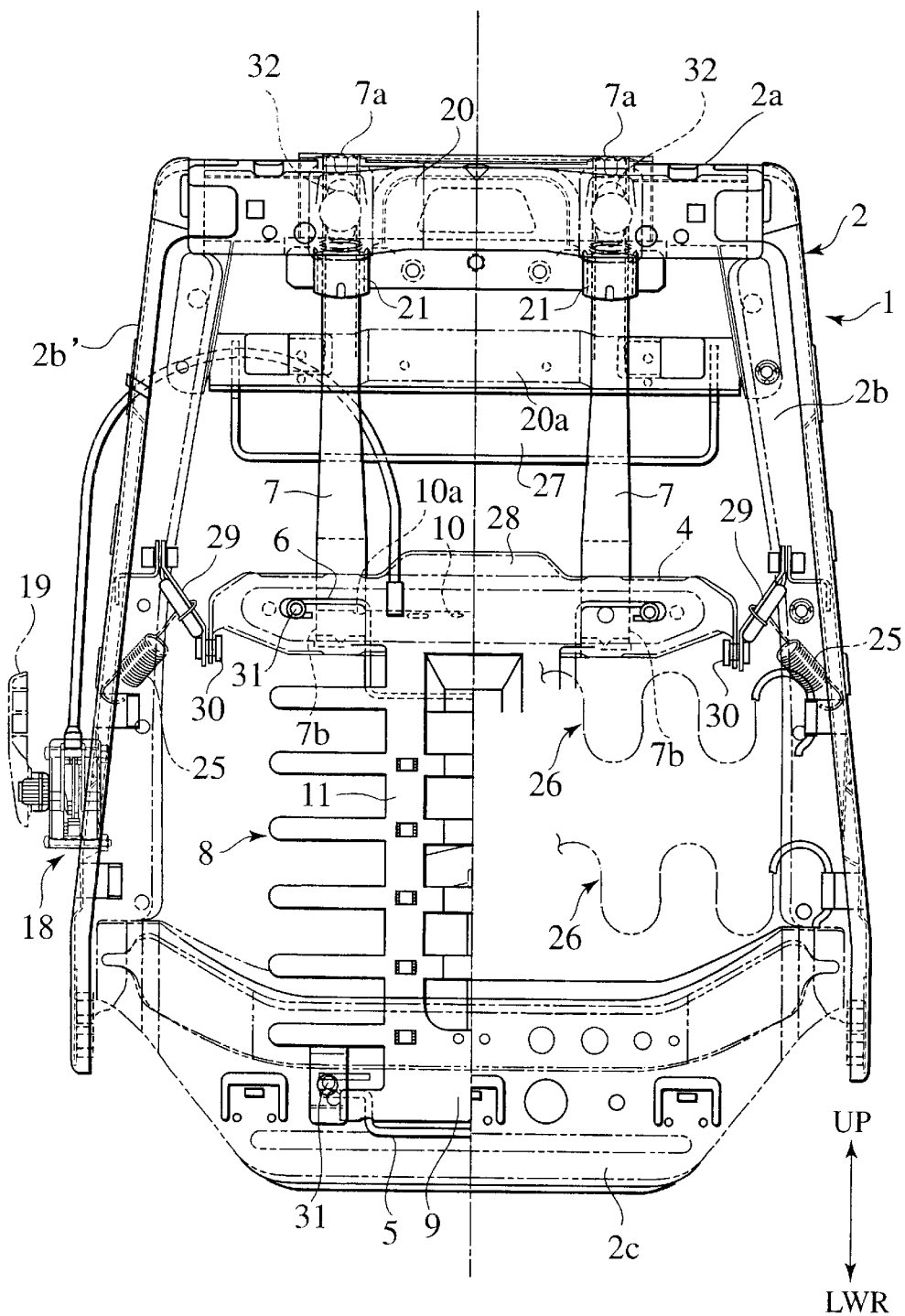
FIG. 5 is a front view of the automotive seat-back structure, showing a condition that the lumbar supporting member is joined to the seat-back frame of FIG. 4.

As shown in FIG. 5, a first supporting member (wire) 5 is fixed to a lower end of the seat-back frame 2, namely, a later-mentioned under frame 2c by a bolt 31. Similarly, a second supporting member (wire) 6 is fixed to the actuating member 4 by another bolt 31.

Figure 6:
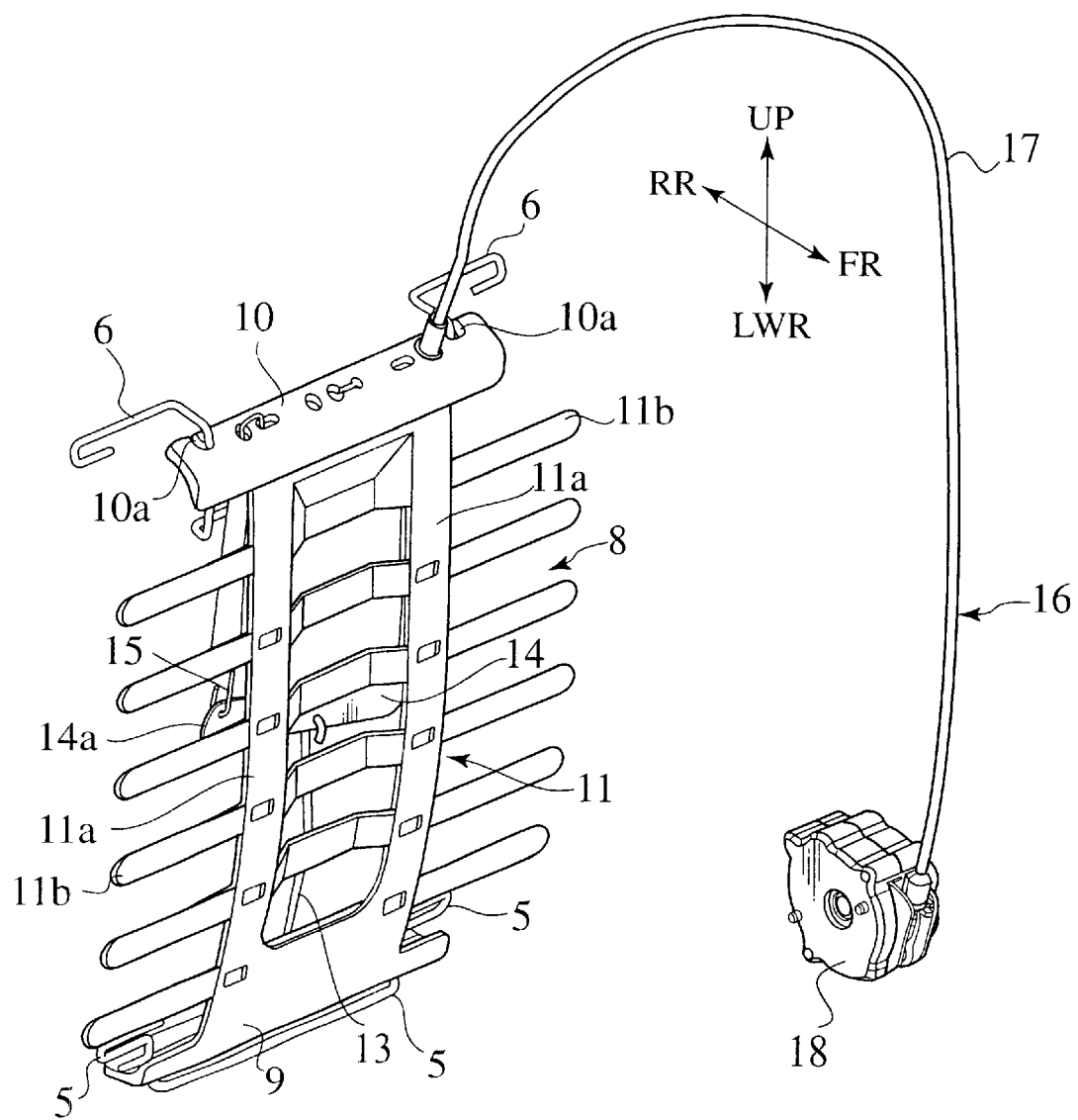
FIG. 6 is a perspective view showing the front side of the lumbar supporting member of FIG. 4.
Figure 7:
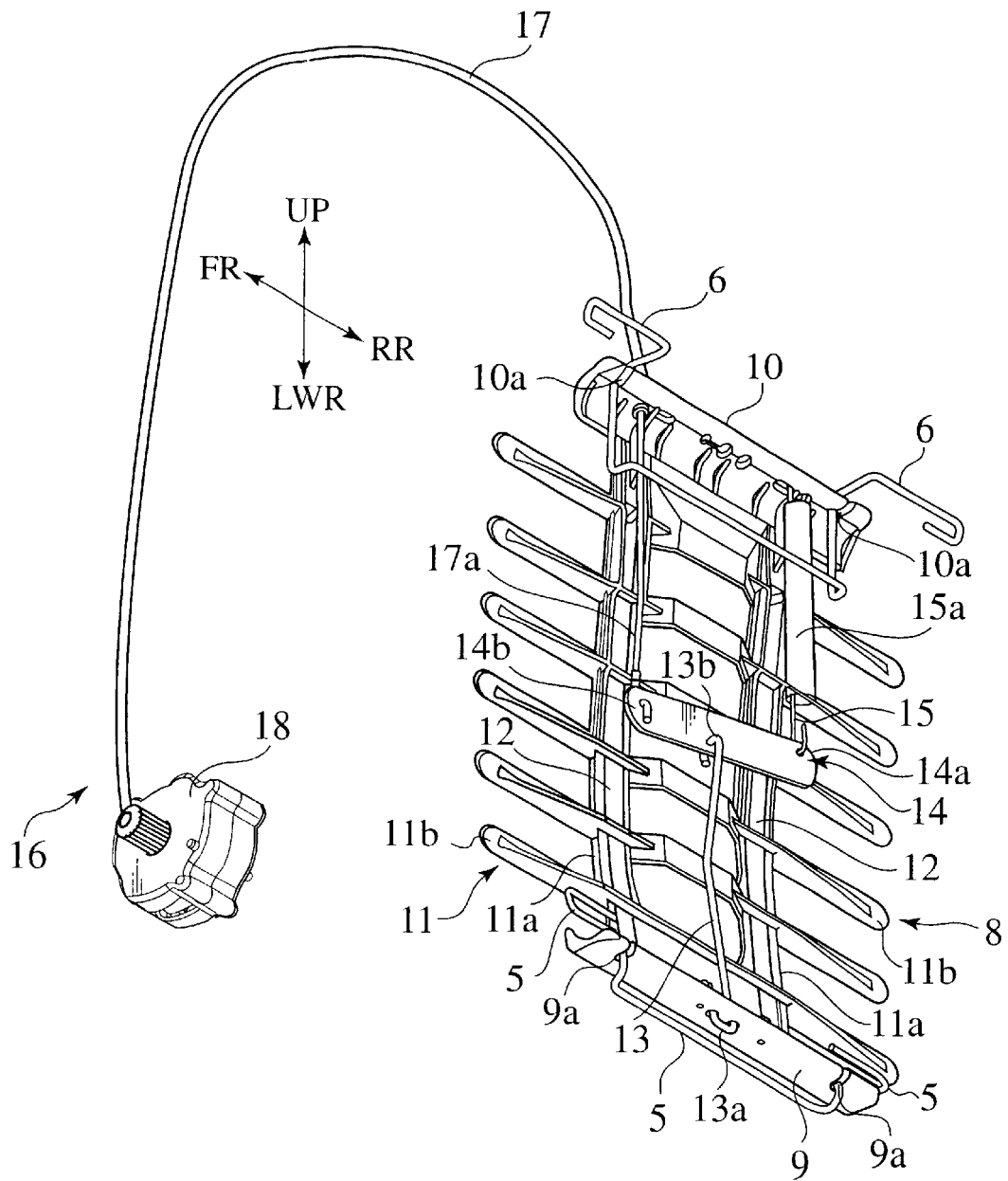
FIG. 7 is a perspective view showing the back side of the lumbar supporting member of FIG. 6.

The lumbar supporting member 8 has a lowermost part 9, an uppermost part 10 and a main part 11 which are made of synthetic resins into one body. Owing to the formation of notches 9a for engagement with the first supporting member 5, the lowermost part 9 is adapted so as to be rotatable to the front side FR and the rear side RR. Similarly, owing to the formation of notches 10a for engagement with the second supporting member 6, the uppermost part 10 is constructed to be rotatable to the front side FR and the rear side RR and also movable to the upper side UP and the lower side LWR. The main part 11 is also movable to the front side FR so as to allow the passenger's lumber vertebra (not shown) to be pushed and supported. As shown in FIGS. 6 and 7, the main part 11 includes a pair of first members 11a arranged left and right so as to extend up and down and six pieces of second members 11b arranged so as to bridge over the first members 11a left and right and further extend outward in the form of ribs. Behind the first members 11a of the main part 11, the lumbar supporting member 8 has first urging means 12 in the form of plate springs. In operation, the first urging means 12 urges the main part 11 in a direction to return the first members 11a from their FR(front side)-projected positions to their generally-flattened positions.

The seat-back frame 2 consists the upper frame 2a positioned on the uppermost end to extend substantially horizontally, side frames 2b, 2b' arranged left and right of the upper frame 2a to extend up and down and the under frame 2c disposed between the lowermost ends of the side frames 2b, 2b' to extend substantially horizontally. These frames 2a, 2b, 2b', 2c are welded with each other. The upper frame 2a is provided, on a rear face 2aa thereof, with stop rubbers 32 which come into elastic contact with the rear faces of the respective armature pipes 7.

A center wire 13 has its lower end 13a engaged with the lowermost part 9 of the lumbar supporting member 8. A yoke bar 14 is pivotal-connected, at its center, with an upper end 13b of the center wire 13. An end 14a of the yoke bar 14 and the uppermost part 10 are usually urged to the UP side by second urging means 15 in the form of a coil spring. That is, the second urging means 15 is always urged in its shrinkage direction.

Through the other end 14b, the yoke bar 14 is connected with an inner cable 17a of a cable 17 of operating means 16. By manipulating the operating means 16, it is possible to project the main part 11 of the lumbar supporting member 8 to the front side FR in opposition to the first and second urging means 12, 15. Reference numeral 15a denotes a cylindrical cover for covering the second urging means 15.

A hollow retainer plate 20 having a rectangular cross section is welded to the front side FR of the upper frame 2a. Below and behind the retainer plate 20, a rear side member 20a is fixed to the upper frame 2a. Welded to the rear side member 20a are armature holders 21, 21 through which the armature pipes 7, 7 pass up and down. In other words, by the armature holders 21, 21, the armature pipes 7, 7 are carried so as to move up and down. Each armature pipe 7 vertically penetrates the retainer plate 20 through upper and lower holes 22, 22 formed in the plate 20 and also elongated back and forth. Headrest holders 23, 23 of synthetic resin are respectively secured on upper ends 7a, 7a of the armature pipes 7, 7 to carry stays 24, 24 for the headrest 3. In detail, each headrest holder 23 holds the stay 24 in a manner that it can be shifted up and down and also maintained at an appropriate position.

The operating means 16 includes a retractor 18 fixed on the other side frame 2b' of the seat-back frame 2 and capable of winding the inner cable 17a of the cable 17 and a manipulating lever 19 which is rotatable in both winding and rewinding directions of the retractor 18, as shown in FIG. 5. By handling the manipulating lever 19 in the winding direction, the inner cable 17*a* of the cable 17 is wound into the retractor 18 to lift up the other end 14*b* of the yoke bar 14. The lifting of the other end 14*b* allows the yoke bar 14 to be rotated about the end 14*a* and also causes the center wire 13 to be lifted. Consequently, the lowermost part 9 of the lumbar supporting member 8 is raised to shorten a dimension between the uppermost part 10 and the lowermost part 9 while projecting the vertically-central part of the main part 11 to the front side FR. In this way, it is possible to support the passenger's lumber vertebra. The rotating of the yoke bar 14 is limited when the inner cable 17*a* of the cable 17 is wound into the retractor 18 of the operating means 16 at maximum. Nevertheless, the rotating position of the yoke bar 18 itself is controlled by the equilibrium of the expansion of the second urging means 15 and the above winding of the cable 17.

Reference numeral 25 designates third urging means in the form of coils. These coils are suspended on both ends of the actuating member 4 and the side frames 2*b*, 2*b*' so as to always urge the actuating member 4 to the front side. Similarly, reference numeral 26 denotes S-shaped fourth urging means which are arranged below the actuating member 4 and suspended between the side frames 2*b* and 2*b*' so as to elastically support the passenger's back through a not-shown seat-back pad. Reference numeral 27 designates a U-shaped stopper wire which is suspended from both ends of the rear side member 2*aa* of the upper frame 2*a* to prevent the armature pipes 7, 7 from rotating excessively.

The actuating member 4 is formed with a rigid body, such as iron plate, and rectangular-shaped so as to extend left and right. Further, the member 4 is provided, on its upper side between the armature pipes 7, 7, with a slanted part 28 standing rearward.

In the front view of FIG. 5, the respective armature pipes 7, 7 are juxtaposed left and right to extend vertically. In front view, the holding positions by the armature pipes 7, 7 are at least closer to the center of the seat back 1 than the shoulder points of the AF05% tile-mannequin (SAE). That is, it means that the armature pipes 7, 7 are arranged inside of the shoulder points of almost all passenger of grownup build. Therefore, even if the passenger is subjected to a load from the front side FR of the seat-back frame due to the rear-end collision of the passenger's vehicle, the passenger's shoulder would not interfere with the armature pipes 7, 7.

In the side view of FIG. 1, the rear side of each armature pipe 7 is bent in a generally V-shaped manner toward the front side FR, providing a bending part 7*c*. Without interfering with respective lower ends 24*a*, 24*a* of the stays 24, 24 of the headrest 3, the bending parts 7*c*, 7*c* of the pipes 7, 7 are formed adjacently to the ends 24*a*, 24*a*, with inner curved faces of 20-millimeter radius.

The seat back of the embodiment operates as follows. As shown in FIG. 1, under the normal condition that the passenger (not shown) has a not shown seat cushion and reclines the passenger's back on the seat back 1, there are defined a little clearance between the passenger's head and the headrest 3 and a little clearance between the passenger's back and the actuating member 4. In actual, although there are pads, leather members, etc. interposed between the passenger's back and the actuating member 4, there exists a condition that no load from the passenger is applied on the actuating member 4. Additionally, since the lumbar supporting member 8 is supported by the actuating member 4 through the second supporting member 6, the lumbar supporting member 8 is capable of not only moving on acceptance of an impact pressure by the passenger's back but also supporting the passenger's lumber vertebra in case of no impact.

Since the first supporting member 5 and the second supporting member 6 are together made from wires, they allow the lumbar supporting member 8 to rotate smoothly even when it projects into deformation or returns to the generally-flat position.

When the passenger's vehicle is run into from behind and consequently, the pads etc. move to the rear side RR of the vehicle since the passenger on seat is pushed to the same side by the secondary collision, the actuating member 4 is urged to the rear side RR by the passenger's back through the pads etc. while an actuating link 29 is rotating about a bolt 30. Even if the pads etc. move to the rear side RR due to the passenger's load directing to the rear side RR, there is no possibility that the pads etc. dig between the armature pipes 7, 7 since at least the passenger's shoulder points are identical to the shoulder points in accordance with the AF05% tile-mannequin. Thus, the armature pipes 7, 7 is not prevented from rising with their rotation, whereby the headrest 3 can be provided with a sufficient working span.

The lumbar supporting member 8 has the lowermost part 9 for engagement with the first supporting member 5, the uppermost part 10 for engagement with the second supporting member 6 and the first urging means 12 which is formed into one body with the main part 11. As mentioned before, the main part 11 is adapted so as to project forward in order to press the passenger's lumbar vertebra. In operation, the first urging means 12 encourages the returning of the main part 11 from its projected position. To the lowermost part 9 of the lumbar supporting member 8, the yoke bar 14 is linked so as to swing against the part 9. In the yoke bar 14, the end 14*a* is always urged to the upper side UP by the second urging means 15, while the other end 14*b* is coupled to the operating means 16. That is, by manipulating the operating means 16, it is possible to project the main part 11 of the lumbar supporting member 8 in opposition to the first urging means 12 and the second urging means 15. Therefore, when manipulating the operating means 16 in a direction to project the main part 11, the passenger's lumbar vertebra can be supported in opposition to the first and second urging means 12, 15. While, when manipulating the operating means 16 in a direction not to project the main part 11, the main part 11 is moved so as not to support the passenger's lumbar vertebra by the first and second urging means 12, 15.

In this way, when the actuating links 29 rotate to both upper side UP and rear side RR of the seat back 1, then the lower ends of the armature pipes 7, 7, namely, the actuating member 4 is moved to both upper side UP and rear side RR. With this movement, the headrest holders 23, 23 are obliquely elevated to the upper side UP and the front side FR. Due to the oblique elevation, the stays 24 of the headrest 3 are moved to the upper side UP and also the front side FR. In other words, owing to the arrangement of the upper ends 7*a*, 7*a* of the armature pipes 7, 7 inside a hollow box defined by the retainer plate 20 and the upper frame 2*a*, the load is not transmitted via the pads to the armature pipes 7, 7, particularly, the upper ends 7*a*, 7*a*. Consequently, the upper ends 7*a*, 7*a* of the armature pipes 7, 7 are prevented from being sifted.

As mentioned before, since the armature pipes 7, 7 and the stays 24, 24 are constructed so as to move together with respect to the armature holders 21, 21, the headrest 3 carried by the stays 24, 24 can abut against the passenger's head thereby to support it. In this way, the passenger's head in a residual movement caused by the movement of the upper half of the passenger directing the rear side RR can be certainly supported by the movement of the headrest 3. Simultaneously, owing to the provision of the slanted part 28 of the actuating member 4, it is possible to move the back face of the pad along the slanted part 28 smoothly. That is, there is a reduced possibility that the actuating member 4 digs into the pad.

Additionally, since the back faces of the armature pipes 7, 7 are bent in a V-shaped manner toward the actuating member 4, even when the member 4 is moved to the rear side RR, there is no possibility of its projecting backward thereby to ensure a space against another passenger on the rear seat.

Again, as the stays 24, 24 of the headrest 3 are supported by the headrest holders 23, 23 movably up and down, it is possible to bring the headrest 3 into any position of the passengers' heads with different bodies appropriately.

Furthermore, the third urging means (coils) 25 for urging the actuating member 4 to the front side FR is carried between the actuating links 29 and the side frames 2b, 2b' of the seat-back frame 2. Accordingly, if any backward force is not applied on the member 4 via the passenger's back, the member 4 occupies its front side (FR) position due to the action of the third urging means 25. That is, since the headrest 3 carried by the armature pipes 7, 7 is accommodated in the rear side RR position due to the "seesaw" principle, the automotive comfortableness for passengers is not influenced.

In the preceding explanation about the operation, it has been argued that the passenger's head can be certainly supported by the movement of the headrest 3. Nevertheless, it should be noted that both movements of the headrest 3 and the seat back 1 are nothing but relative movements. In detail, the above argument further implies that even if the seat back 1 is displaced to the rear side RR by the passenger's back, the headrest 3 does not move with respect to the passenger's head, maintaining its protective position. Although the second supporting member 6 is fixed to the actuating member 4 in the above-mentioned embodiment, the member 6 may be extended up to appropriate positions of the armature pipes 7, 7 in the modification.

The scope of the invention is defined with reference to the following claims.

What is claimed is:

1. An automotive seat-back structure comprising:
    a seat-back frame;
    supporting means carried by the seat-back frame, the supporting means being capable of swinging back and forth against an upper end of the seat-back frame and also capable of moving up and down against the upper end of the seat-back frame;
    a headrest supported by an upper end of the supporting means;
    an actuating member carried by a lower end of the supporting means, the actuating member being movable only on receipt of an impact pressure by a passenger's back;
    a first supporting member carried by a lower end of the seat-back frame;
    a second supporting member carried by either one of the actuating member and the supporting means; and
    a lumbar supporting member carried by the first supporting member and the second supporting member to support the passenger's lumbar vertebra on pressure, the lumbar supporting member being rotatable back and forth and also movable up and down.

2. The automotive seat-back structure of claim 1, wherein the lumbar supporting member comprises:
    a lowermost part which is engageable with the first supporting member;
    an uppermost part which is engageable with the second supporting member; and
    first urging means formed in one body with a main part of the lumbar supporting member, the main part being capable of projecting forward to support the passenger's lumbar vertebra on pressure, the first urging means being adapted so as to encourage the main part's returning from its projected position.

3. The automotive seat-back structure of claim 2, further comprising:
    a yoke bar carried by the lowermost part of the lumbar supporting member, the yoke bar being capable of swinging against lowermost part of the lumbar supporting member;
    second urging means connected to one end of the yoke bar, for always urging the one end of the yoke bar upward; and
    operating means operatively connected to another end of the yoke bar, wherein
    the operation of the operating means allows the main part of the lumbar supporting member to be moved in opposition to the first urging means and the second urging means.

4. The automotive seat-back structure of claim 2, wherein
    the main part of the lumbar supporting member includes a pair of first members separated from each other so as to extend up and down and a plurality of second members extending over the first members; and
    the first urging means includes a pair of plate springs arranged along the first members respectively, thereby to urging the main part.

5. The automotive seat-back structure of claim 3, wherein the second urging means is in the form of a coil spring.

6. The automotive seat-back structure of claim 3, wherein the operating means comprises:
    a cable connected to the other end of the yoke bar;
    a retractor allowing the cable to be wound thereinto; and
    a manipulating lever for operating the retractor to wind and rewind the cable.

7. The automotive seat-back structure of claim 1, wherein the first supporting member and the second supporting member are together made from wires.

8. The automotive seat-back structure of claim 1, wherein the supporting means comprises a pair of armature pipes arranged inside the seat-back frame so as to extend up and down.

* * * * *